(12) United States Patent
Sharma et al.

(10) Patent No.: US 9,473,375 B2
(45) Date of Patent: Oct. 18, 2016

(54) SPONSORING USAGE OF CONTENT PROVIDER WEB SITES AND APPLICATIONS BASED ON NETWORK PATH UTILIZATION

(71) Applicant: Verizon Patent and Licensing Inc., Basking Ridge, NJ (US)

(72) Inventors: Manish Sharma, San Jose, CA (US); Gurudutt Pai, North Andover, MA (US); Tushar Chaudhary, Mountain View, CA (US); Kevin Flores, San Jose, CA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 37 days.

(21) Appl. No.: 14/132,865

(22) Filed: Dec. 18, 2013

(65) Prior Publication Data
US 2015/0172470 A1  Jun. 18, 2015

(51) Int. Cl.
*H04M 11/00* (2006.01)
*H04L 12/26* (2006.01)
*H04M 15/00* (2006.01)

(52) U.S. Cl.
CPC .......... *H04L 43/0882* (2013.01); *H04M 15/09* (2013.01); *H04M 15/8083* (2013.01)

(58) Field of Classification Search
CPC . H04W 4/24; H04M 2215/32; H04M 15/00; H04M 2215/2026; H04M 17/00; H04M 15/08; H04M 15/68; H04M 2215/0192; H04M 15/09; H04M 15/8083; G06Q 20/123; G06Q 20/14; G06Q 20/08; H04L 43/0882

USPC ...................................... 455/406; 705/39, 40
See application file for complete search history.

(56) References Cited

U.S. PATENT DOCUMENTS

| | | | |
|---|---|---|---|
| 7,590,406 B2 * | 9/2009 | Aaltonen et al. ............. | 455/405 |
| 2010/0223096 A1 * | 9/2010 | Bosan et al. ................... | 705/10 |
| 2012/0155380 A1 * | 6/2012 | Hodges ......................... | 370/328 |
| 2012/0157038 A1 * | 6/2012 | Menezes et al. ............. | 455/405 |
| 2012/0158829 A1 * | 6/2012 | Ahmavaara et al. ......... | 709/203 |
| 2012/0209753 A1 * | 8/2012 | Hodges ................. | H04L 12/146 |
| | | | 705/30 |
| 2012/0278229 A1 * | 11/2012 | Vishwanathan et al. ...... | 705/40 |
| 2013/0288638 A1 * | 10/2013 | Baker et al. ................... | 455/405 |
| 2013/0316674 A1 * | 11/2013 | Cho et al. ..................... | 455/406 |
| 2013/0316703 A1 * | 11/2013 | Girard .................. | G06Q 20/145 |
| | | | 455/432.1 |
| 2014/0024340 A1 * | 1/2014 | Raleigh ......................... | 455/406 |
| 2015/0072641 A1 * | 3/2015 | Raleigh et al. .............. | 455/406 |

* cited by examiner

*Primary Examiner* — Allahyar Kasraian
*Assistant Examiner* — B. M. M Hannan

(57) ABSTRACT

A device receives, from a content server device, content information associated with content accessed by a user device, and information associated with utilization of a network path provided between the user device and the content server device. The device receives information associated with data usage by the user device for accessing the content, and determines whether the data usage is sponsored by a sponsor based on the content information and the information associated with the utilization of the network path. The sponsor sponsors data usage associated with particular content when the utilization of the network path is below a threshold. The device assigns charges for the data usage to an account associated with the user device when the data usage is not sponsored by the sponsor, or to an account associated with the sponsor when the data usage is sponsored by the sponsor.

20 Claims, 17 Drawing Sheets

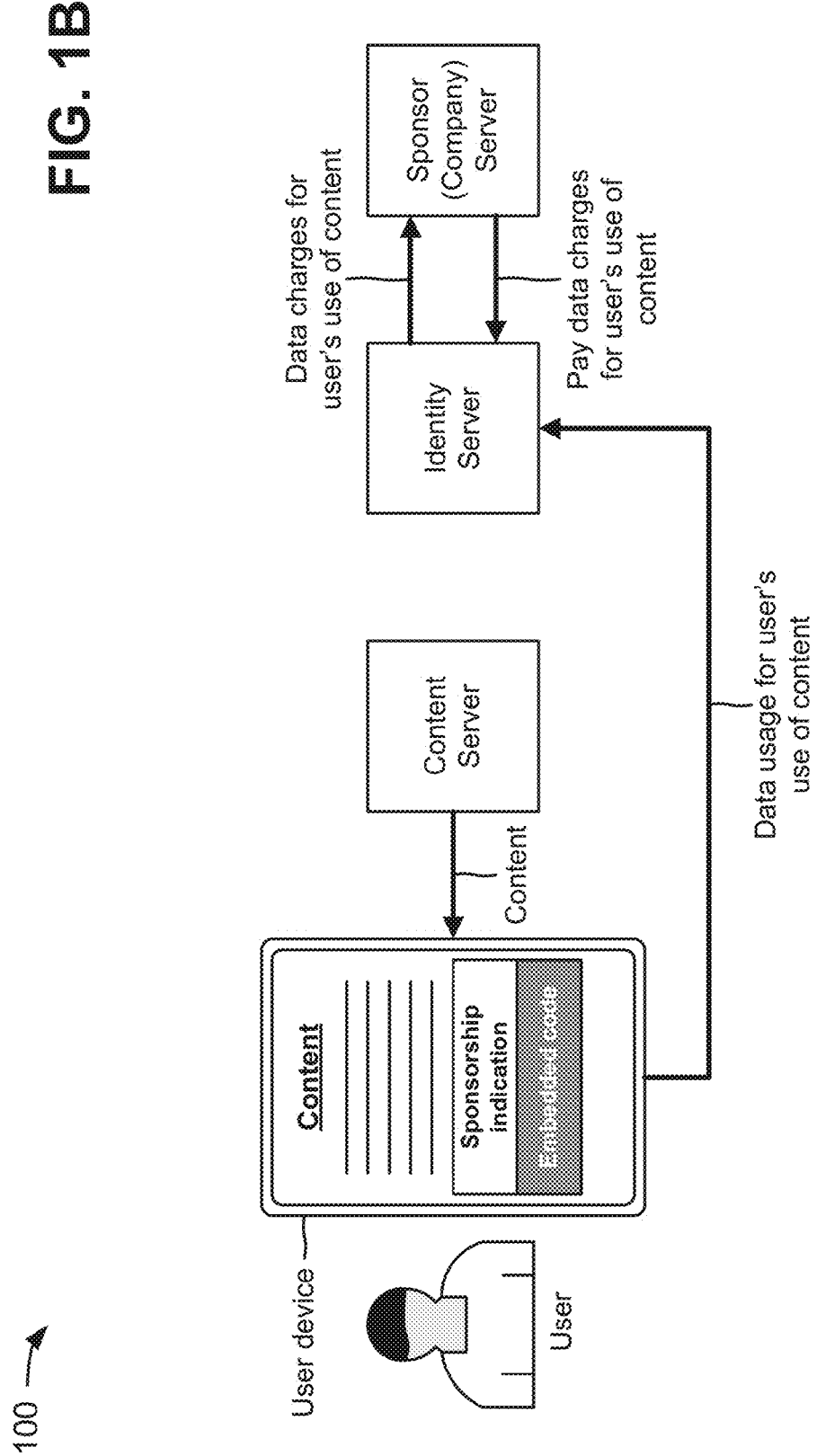

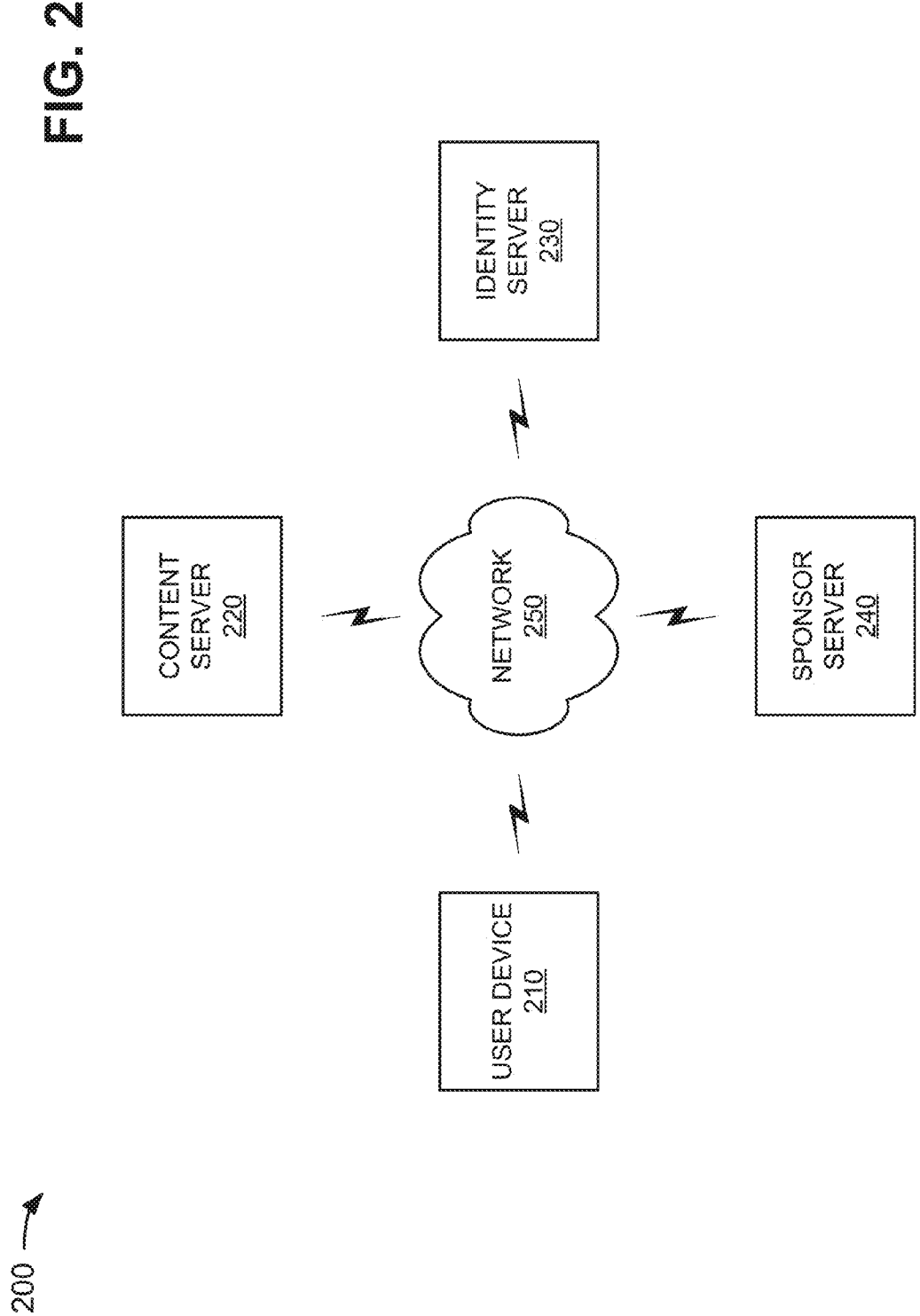

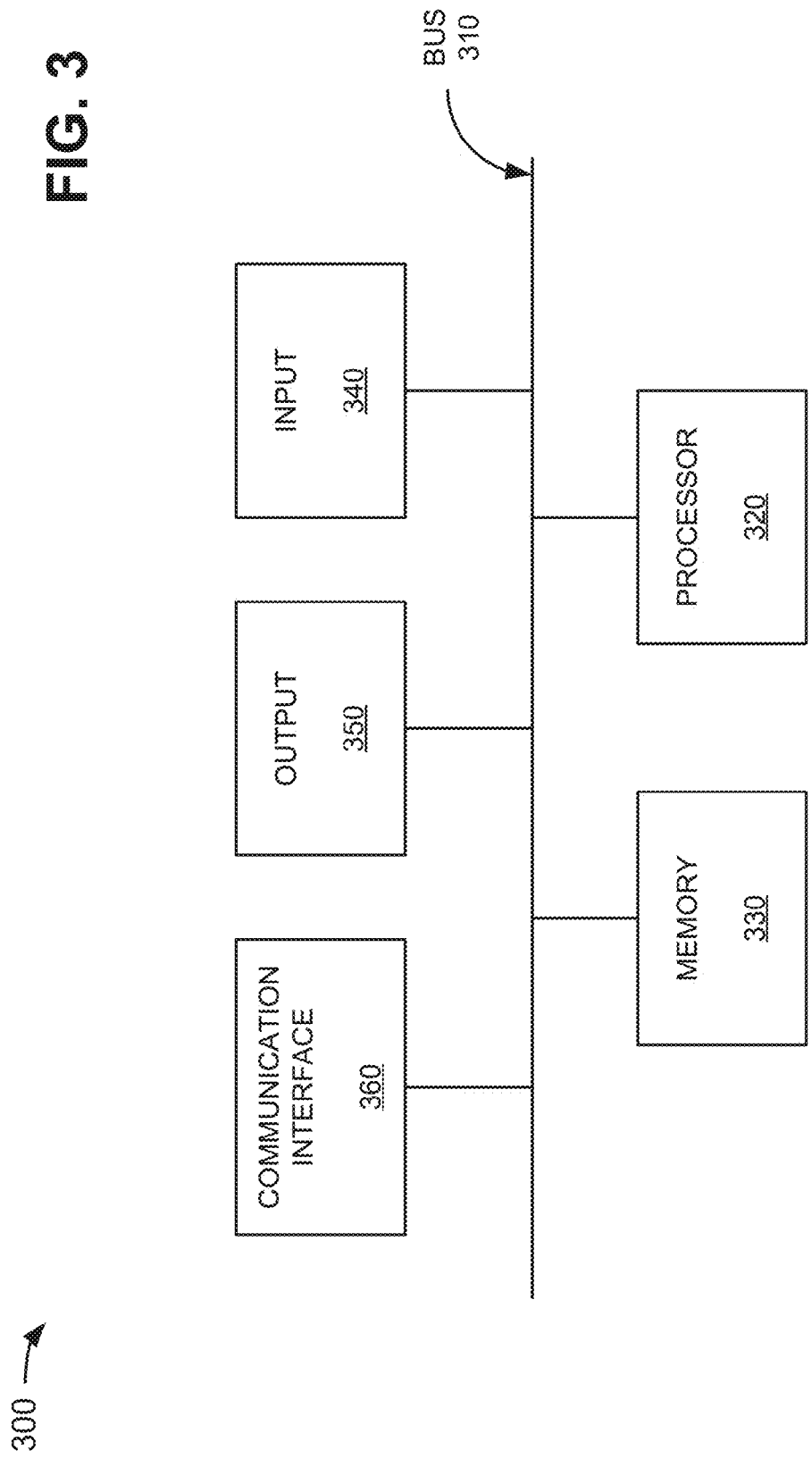

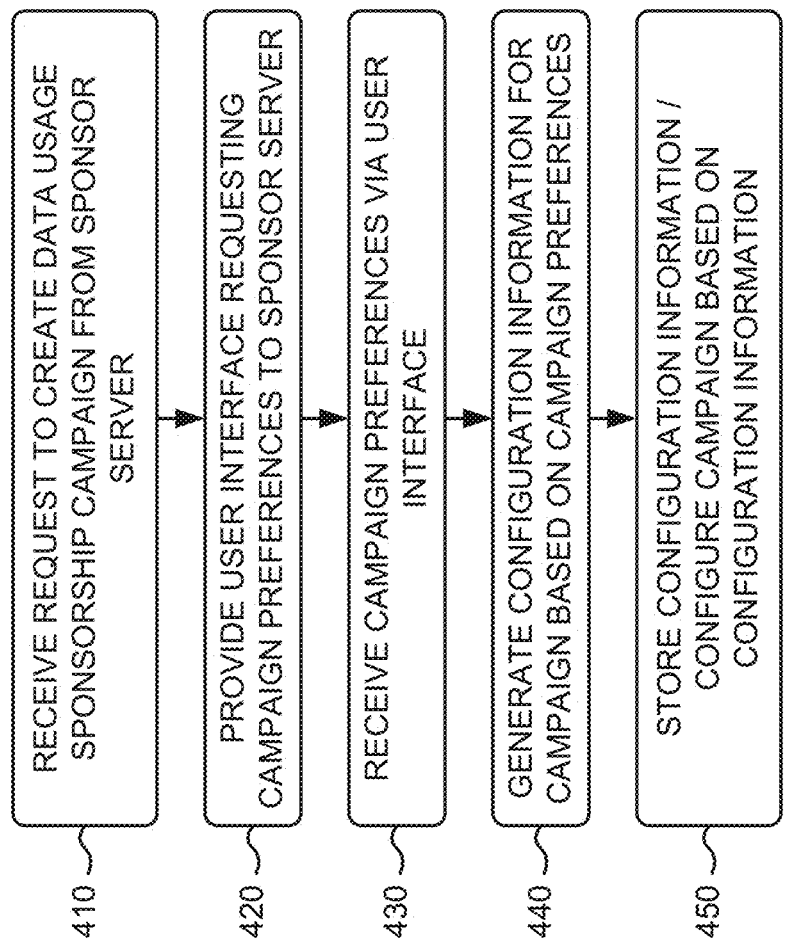

FIG. 5B

| Campaign ID | Sponsor | Sponsor Account | Date Range | Content | Utilization Threshold | Utilization Tiers | Deadline | Display T/H | Max Util. Cost |
|---|---|---|---|---|---|---|---|---|---|
| 123 | Movie provider | 123456 | 1/1/2014 to 1/10/2014 | Movie | < 50% | N/A | No | No | N/A |
| 456 | Company | 789101 | N/A | Web site | < 10% | 3 tiers | No | No | N/A |
| 7890 | Sports Team | 234567 | 2/2/2014 to 3/2/2014 | Web site | < 10% | N/A | Yes | < $0.50 per Gbit | $1 per Gbit |
| 3245 | Content provider | 448761 | 3/3/2013 to 3/5/2014 | Movie | N/A | 2 tiers | Yes | No | $0.90 per Gbit |
| 673 | Airline | 839248 | 1/3/2013 to 1/19/2014 | URL5 | < 30% | N/A | Yes | < $0.75 per Gbit | N/A |
| *** | *** | *** | *** | *** | *** | *** | *** | *** | *** |

Data structure (520)

500

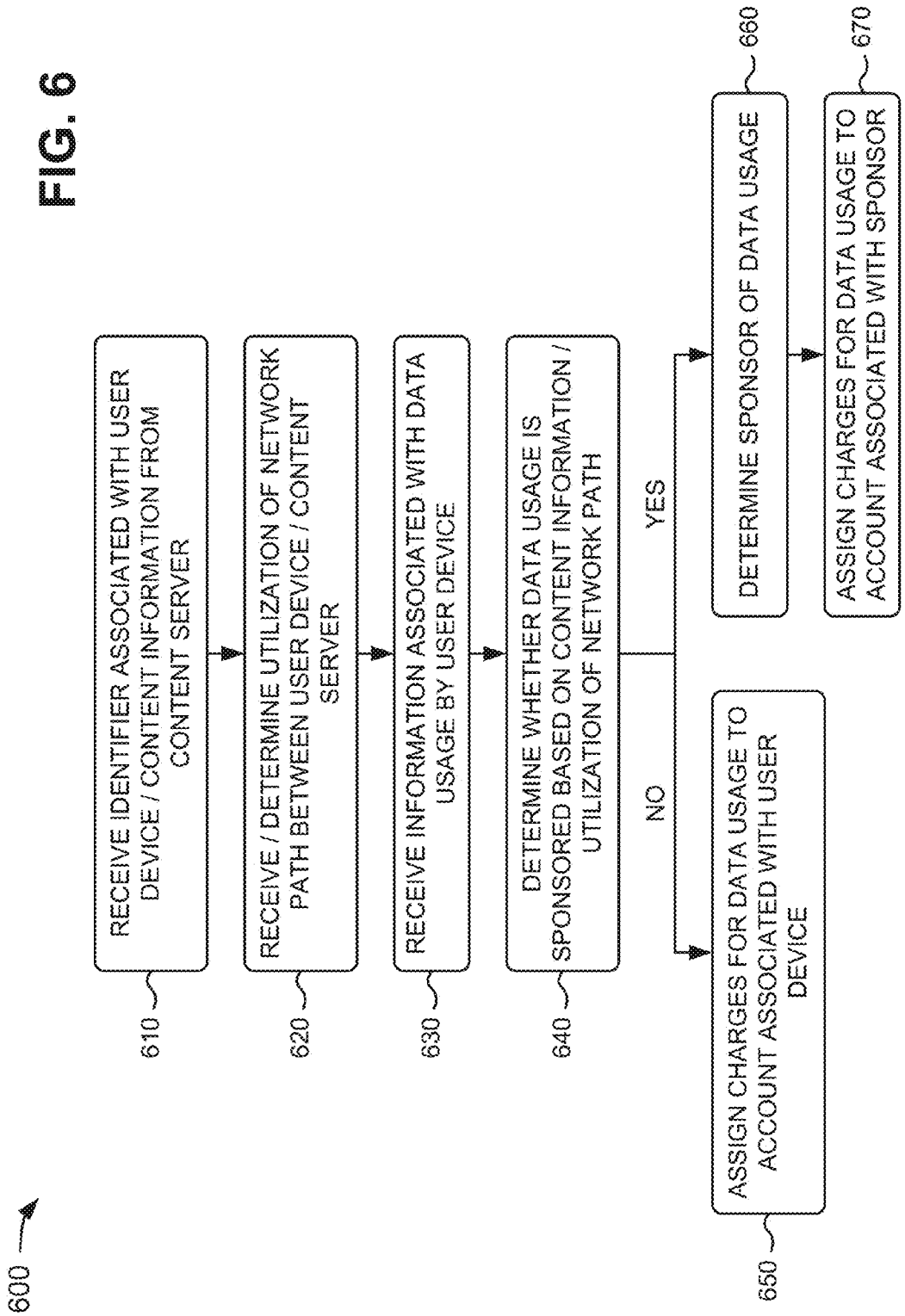

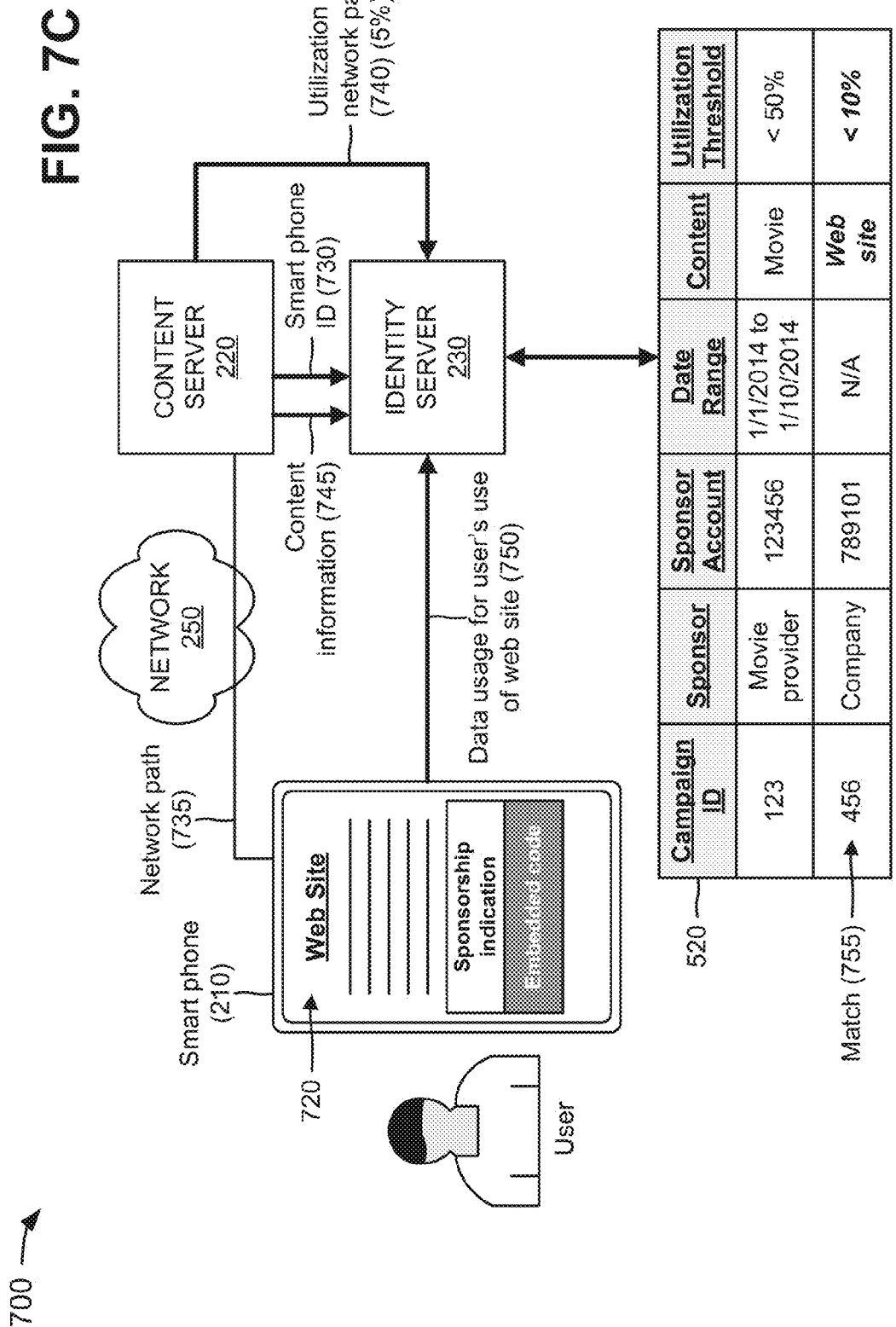

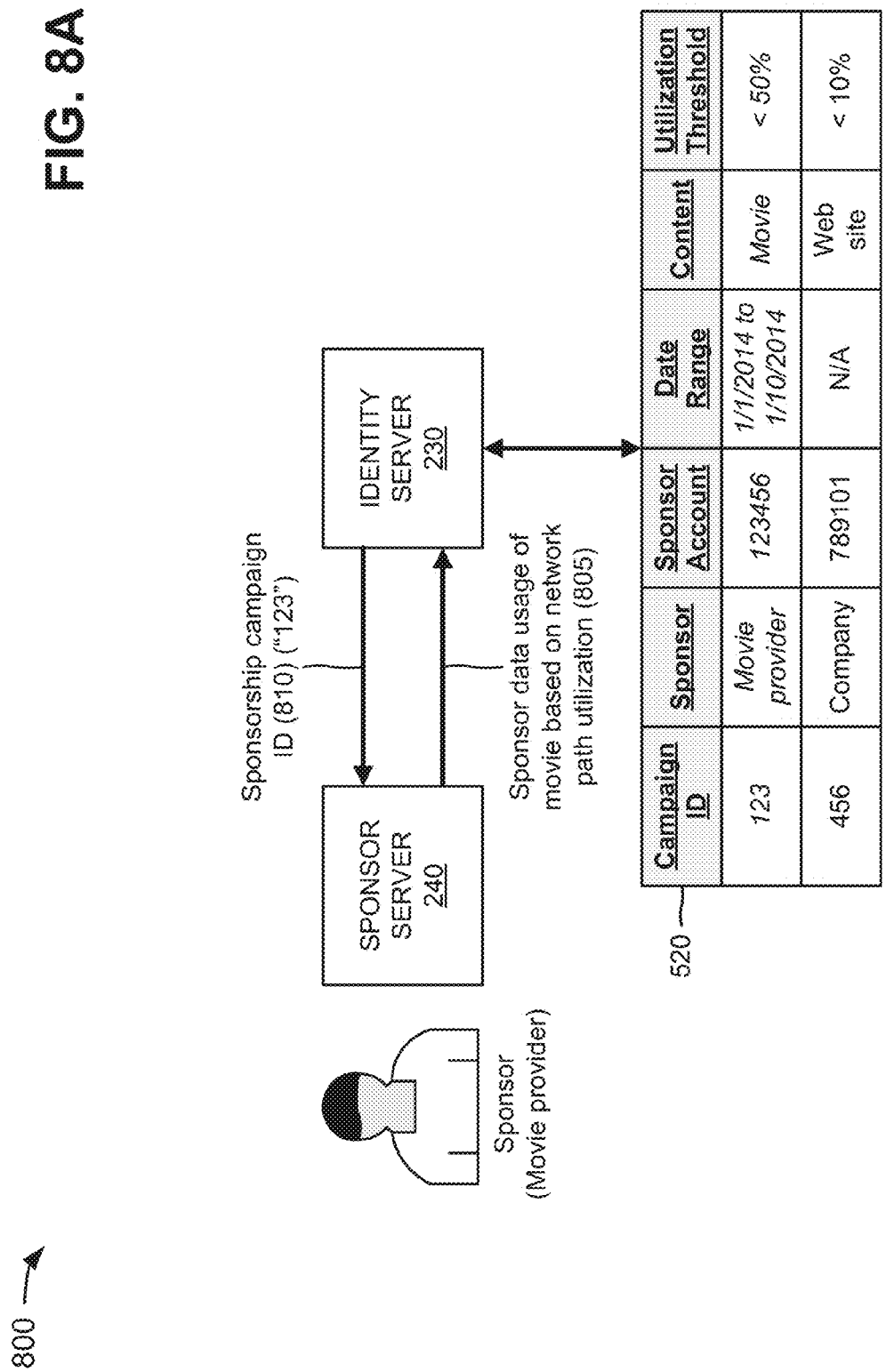

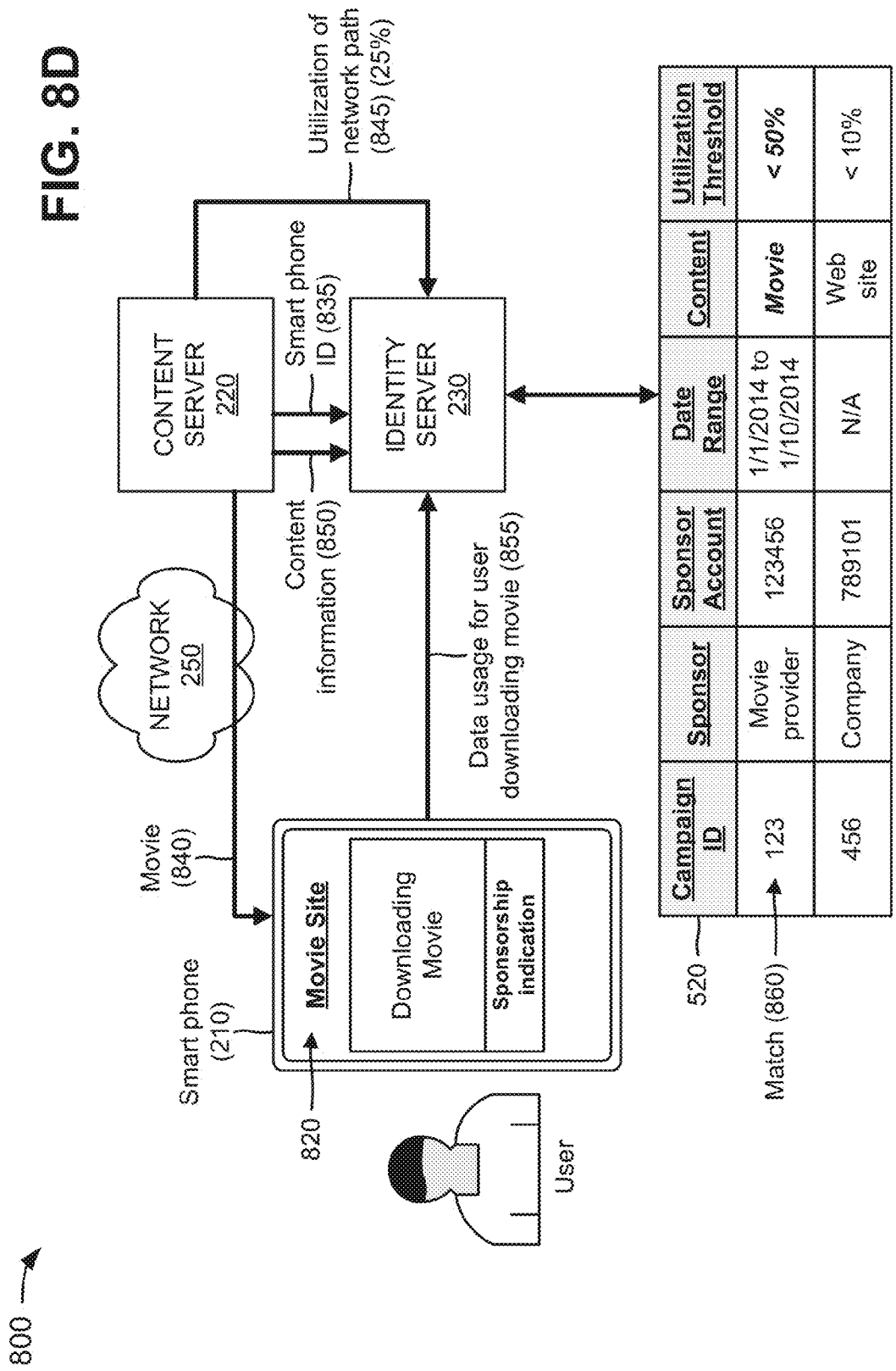

SPONSORING USAGE OF CONTENT PROVIDER WEB SITES AND APPLICATIONS BASED ON NETWORK PATH UTILIZATION

BACKGROUND

A user may utilize a mobile device (e.g., a smart phone, a tablet computer, a laptop computer, etc.) to access and view content, such as, for example, a web site, a video, etc., provided by a content provider. The user may accrue data usage charges for accessing the content. Many employers permit employees to bring personally-owned mobile devices to their workplace, and to use those mobile devices to access privileged company information and applications. Such an arrangement may be referred to as bring your own device (BYOD). The employers may manually reimburse the employees for data usage charges accrued at the workplace if the employees submit paperwork (e.g., telephone bills) to the employers.

BRIEF DESCRIPTION OF THE DRAWINGS

FIGS. 1A and 1B are diagrams of an overview of an example implementation described herein;

FIG. 2 is a diagram of an example environment in which systems and/or methods described herein may be implemented;

FIG. 3 is a diagram of example components of a device that may correspond to one or more of the devices of the environment depicted in FIG. 2;

FIG. 4 is a flow chart of an example process for creating and configuring a data usage sponsorship campaign for a sponsor;

FIG. 5B is a diagram of an example data structure that may be used in connection with the example process shown in FIG. 4;

FIG. 6 is a flow chart of an example process for sponsoring usage of content provider web sites and/or applications based on network path utilization;

FIG. 7A-7D are diagrams of an example relating to the example process shown in FIG. 6; and FIG. 8A-8E are diagrams of another example relating to the example process shown in FIG. 6.

DETAILED DESCRIPTION OF PREFERRED EMBODIMENTS

The following detailed description refers to the accompanying drawings. The same reference numbers in different drawings may identify the same or similar elements.

Figure 1A:
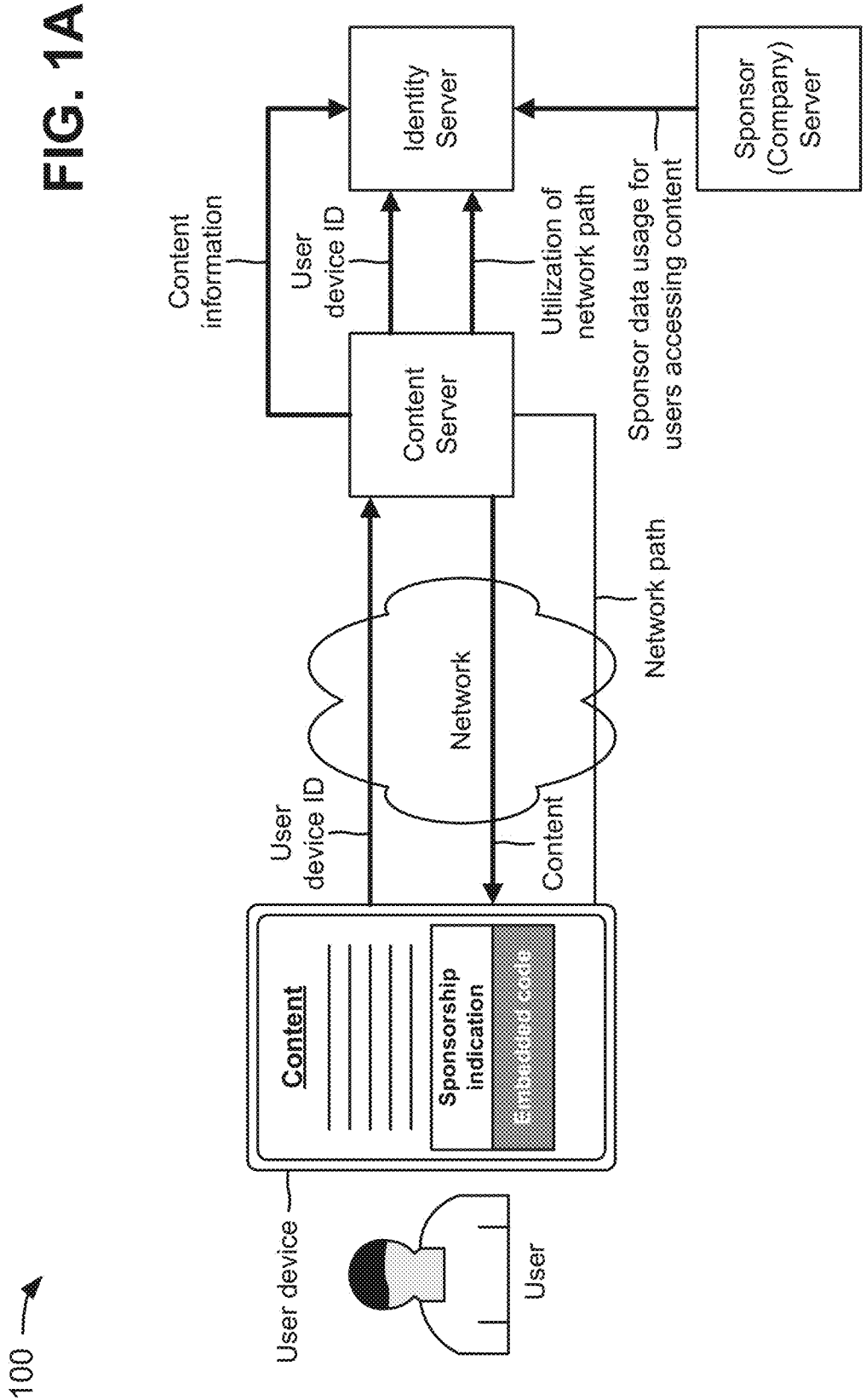

FIGS. 1A and 1B are diagrams of an overview of an example implementation 100 described herein. As shown in FIG. 1A, assume that a user is associated with a user device that receives content from a content server via a network path provided between the user device and the content server by a network. In some implementations, the content provided to the user device may include embedded code that causes the user device to provide a device identifier (ID) of the user device to the content server (e.g., with the permission of the user) and/or to an identity server. The content server may forward the device ID to the identity server. As further shown in FIG. 1A, the embedded code may cause the user device to display information indicating that data usage associated with the content is sponsored by a sponsor (e.g., a company).

The content server may determine a utilization of the network path (e.g., a capacity of the network path that is utilized, such as 20%, 30%, etc.), and may forward information associated with the utilization of the network path to the identity server. As further shown in FIG. 1A, the content server may also provide content information to the identity server. The content information may include information identifying the content provided to the user device, a time period associated with when the user device accesses the content, etc. As further shown in FIG. 1A, assume that the company, via a sponsor server, created a sponsorship campaign with the identity server. The sponsorship campaign may indicate that the company will sponsor data usage charges for users accessing the content from the content server.

As the user device accesses and receives the content, data usage may be accrued for the user and information identifying the user's data usage of the content (e.g., the content accessed, the time period when the content is accessed, etc.) may be provided to the identity server, as shown in FIG. 1B. The identity server may receive the device ID, the content information, the information associated with the utilization of the network path, and the information identifying the user's data usage.

Based on the device ID, the content information, the information associated with the utilization of the network path, and the information identifying the user's data usage, the identity server may determine that the user's data usage, associated with the content, is covered by the sponsorship campaign. For example, the sponsorship campaign may cover the user's use of the content when the utilization of the network path is less than a particular threshold, but may not cover the user's use of the content when the utilization of the network path is greater than the particular threshold. Based on this determination, the identity server may provide, to the sponsor server, information identifying data charges associated with the user's use of the content. As further shown in FIG. 1B, the sponsor server may pay the data charges for the user's use of the content in accordance with the sponsorship campaign.

The systems and/or methods described herein may enable entities (e.g., sponsors) to fully or partially sponsor a user's data usage and/or charges associated with using one or more content providers' web pages, web sites, applications, content, etc. The user's data usage and/or charges associated with using one or more content providers' web pages, web sites, applications, content, etc. may be automatically handled, without the user submitting paperwork for reimbursement. The systems and/or methods may also enable the sponsors to define the sponsorship based on parameters, such as utilization of a network path between the user and the content provider, quantity of data used, content, etc.

Content, as used herein, is to be broadly interpreted to include a web site, a web page, an application, a video, audio, an image, text, a software download, and/or a combination of a web site, a web page, an application, a video, audio, an image, text, and/or a software download.

FIG. 2 is a diagram of an example environment 200 in which systems and/or methods described herein may be implemented. As illustrated, environment 200 may include a user device 210, a content server 220, an identity server 230, a sponsor server 240, and a network 250. Devices/networks of environment 200 may interconnect via wired connections, wireless connections, or a combination of wired and wireless connections.

User device 210 may include a device that is capable of communicating over network 250 with content server 220, identity server 230, and/or sponsor server 240. In some implementations, user device 210 may include a radiotelephone; a personal communications services (PCS) terminal that may combine, for example, a cellular radiotelephone with data processing and data communications capabilities; a smart phone; a personal digital assistant (PDA) that can include a radiotelephone, a pager, Internet/intranet access, etc.; a laptop computer; a tablet computer; a desktop computer; a workstation computer; a personal computer; a landline telephone; a gaming device; or another type of computation and communication device.

Content server 220 may include one or more personal computers, workstation computers, server devices, or other types of computation and communication devices. In some implementations, content server 220 may provide content to user device 210 (e.g., via a web site and/or an application). In some implementations, the content may include embedded code that instructs user device 210 to provide an identifier (e.g., a mobile directory number (MDN), a mobile equipment identifier (MEID), an Internet protocol (IP) address, etc.) of user device 210 to content server 220 (e.g., with the permission of the user) and/or identity server 230 while user device 210 receives the content. In some implementations, the embedded code may be provided by identity server 230 to content server 220, and may enable content server 220 to support data usage sponsorship campaigns provided by one or more sponsors (e.g., associated with sponsor servers 240). In some implementations, the embedded code may cause user device 210 to display an indication that the content is sponsored by a sponsor. In some implementations, the embedded code may include an application, a code snippet, a script, a widget, etc. that may enable content server 220 to support the data usage sponsorship campaigns.

Identity server 230 may include one or more personal computers, workstation computers, server devices, or other types of computation and communication devices. In some implementations, identity server 230 may be associated with a communication provider (e.g., an Internet service provider, a telecommunications service provider, a television service provider, etc.) of the user of user device 210. In some implementations, identity server 230 may identify the user of user device 210 based on an identifier (e.g., a MDN, a MEID, an IP address, etc.) associated with user device 210. In some implementations, identity server 230 may provide the embedded code to content server 220. The embedded code may instruct user device 210 to provide the identifier of user device 210 to content server 220 and/or identity server 230 while user device 210 receives the content from content server 220.

Sponsor server 240 may include one or more personal computers, workstation computers, server devices, or other types of computation and communication devices. In some implementations, sponsor server 240 may be associated with an entity (e.g., a company, a government agency, a university, a sports team, etc.) that sponsors data usage for users of user devices 210. For example, sponsor server 240 may be associated with a company that sponsors data usage of particular content (e.g., a movie) provided by content server 220 when utilization of a network path, provided between user device 210 and content server 220, is below a particular threshold; a company that sponsors data usage of particular content (e.g., a television broadcast of a sporting event) by spectators at the sporting event (e.g., a football game, a baseball game, etc.); etc. In some implementations, sponsor server 240 may also provide content to user device 210 in addition to or instead of content server 220. For example, if sponsor server 240 is associated with a company, sponsor server 240 may provide and/or sponsor content (e.g., a company intranet, company documents, etc.) that may be accessed by an employee (e.g., via user device 210).

Network 250 may include a network, such as a local area network (LAN), a wide area network (WAN), a metropolitan area network (MAN), a telephone network, such as the Public Switched Telephone Network (PSTN) or a cellular network, an intranet, the Internet, a fiber optic network, or a combination of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

FIG. 3 is a diagram of example components of a device 300 that may correspond to one or more of the devices of environment 200. In some implementations, one or more of the devices of environment 200 may include one or more devices 300 or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit, etc.), a microprocessor, and/or any processing component (e.g., a field-programmable gate array (FPGA), an application-specific integrated circuit (ASIC), etc.) that interprets and/or executes instructions, and/or that is designed to implement a particular function. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, which enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

FIG. 4 is a flow chart of an example process 400 for creating and configuring a data usage sponsorship campaign for a sponsor. In some implementations, one or more process blocks of FIG. 4 may be performed by identity server 230. In some implementations, one or more process blocks of FIG. 4 may be performed by another device or a group of devices separate from or including identity server 230.

As shown in FIG. 4, process 400 may include receiving a request to create a data usage sponsorship campaign from a sponsor server (block 410). For example, a sponsor (e.g., a company, a hotel, etc.) may cause sponsor server 240 to provide a request to create a data usage sponsorship campaign to identity server 230, and identity server 230 may receive the request to create the data usage sponsorship campaign. In some implementations, the data usage sponsorship campaign may include a campaign where the sponsor pays for data usage by user device 210 based on utilization of a network path provided between user device 210 and content server 220. For example, the sponsor may pay for data usage when user device 210 accesses all content provided by content server 220, particular content provided by content server 220, any content, other content provided by other content providers, etc. based on utilization of network paths provided between user device 210 and content server 220 and/or the other content providers.

In some implementations, the sponsor may cause sponsor server 240 to access identity server 230 via, for example, a user interface (such as a browser) or in another manner. The sponsor may then select, using sponsor server 240, information regarding the data usage sponsorship campaign from the user interface to cause content server 220 to provide the request to create the data usage sponsorship campaign to identity server 230. In some implementations, identity server 230 may offer information for creating the data usage sponsorship campaign to sponsor server 240 without sponsor server 240 providing the request.

As further shown in FIG. 4, process 400 may include providing a user interface requesting campaign preferences to the sponsor server (block 420). For example, identity server 230 may provide a user interface, requesting data usage sponsorship campaign preferences, to sponsor server 240 based on the request. In some implementations, the user interface may request a variety of information associated with the campaign preferences. For example, the user interface may request a name of the sponsor, contact information for the sponsor, an address of the sponsor, a telephone number for the sponsor, account information of the sponsor (e.g., billing information for the sponsor, a tax identification of the sponsor, etc.), etc. In some implementations, identity server 230 may previously obtain the aforementioned information if the sponsor establishes an account with identity server 230.

In some implementations, the user interface may request identifiers of user devices 210 to associate with the campaign. For example, if the sponsor is an employer creating a campaign for the employer's employees (e.g., sponsoring all data usage by the employees), the employer may provide identifiers of user devices 210 associated with the employees via the user interface. In some implementations, the user interface may request a date range for the campaign. For example, if the sponsor is a hotel creating a campaign for a hotel guest (e.g., sponsoring data usage by the hotel guest), the hotel may provide a date range associated with when the hotel guest is staying at the hotel (e.g., from Dec. 1, 2013 to Dec. 4, 2013) via the user interface.

In some implementations, the user interface may request content to associate with the campaign. For example, if the sponsor is an employer creating a campaign for an employee of the employer, the employer may indicate, via the user interface, that the employer is sponsoring all data usage of the employee, data usage of particular content by the employee, data usage of only the employer's content, etc. In some implementations, the user interface may request a network path utilization threshold for the campaign. For example, if the sponsor is a movie studio creating a campaign for users accessing a particular movie from content server 220, the movie studio may indicate, via the user interface, that the movie studio is sponsoring data usage for the users accessing the particular movie when utilization of a network path between the users' user devices 210 and content server 220 is less than a particular threshold (e.g., less than 10% of the capacity of the network path). In such an example, the sponsorship may not be offered by the movie studio when the network path utilization is greater than the particular threshold. In some implementations, a sponsor may pay more for data usage as network path utilization increases. For example, the sponsor may pay $0.10 per gigabit (Gbit) when the network path utilization is less than 10%, may pay $1.00 per Gbit when the network path utilization is between 10% and 50%, may pay $5.00 per Gbit when the network path utilization is greater than 80%.

In some implementations, the user interface may request network path utilization tiers for the campaign. For example, if the sponsor is a content provider creating a campaign for users downloading videos, the content provider may indicate, via the user interface, that the content provider will pay 100% of the data usage charges when the network path utilization is less than 10% (e.g., since data costs may be cheap), will pay 60% of the data usage charges when the network path utilization is not less than 10% and is less than 50% (e.g., since data costs may be more expensive), will pay 20% of the data usage charges when the network path utilization is greater than 50% (e.g., since data costs may be even more expensive), etc.

In some implementations, the user interface may request whether a deadline for content delivery may be defined, by a user, for the campaign. For example, if the sponsor is an employer creating a campaign for an employee of the employer, the employer may indicate, via the user interface, that the employee may specify a deadline for content delivery (e.g., within the next four hours). This may enable identity server 230 to select a time of lowest utilization of the network path, between a current time and the specified deadline, for delivering the content to the employee.

In some implementations, the user interface may request whether the sponsor wants to provide an indication of the campaign based on network path utilization cost. For example, if the sponsor is a television service provider creating a campaign for users accessing television content, the television service provider may indicate, via the user interface, that the campaign should not be displayed to the users unless of a cost of the network path utilization is less than a particular value (e.g., in dollars per Gbit). In some implementations, the user interface may request a maximum network path utilization cost for the campaign. For example, if the sponsor is a content provider creating a campaign for users accessing a particular video from content server 220, the content provider may indicate, via the user interface, that the content provider is sponsoring data usage for the users accessing the particular video when the network path utilization cost is less than a particular threshold (e.g., in dollars per Gbit). For example, the content provided may sponsor data usage of the particular video when the network path utilization cost (e.g., associated with downloading the video) is less than $0.50 per Gbit.

In some implementations, a type of the account, of the sponsor, may determine the quantity of campaign preferences that the sponsor is able to identify via the user interface. For example, the user interface may enable the content provider to identify only a portion of the above preferences or identify additional preferences based on the type of the account with which the sponsor is associated.

As further shown in FIG. 4, process 400 may include receiving the campaign preferences via the user interface (block 430). For example, the sponsor may cause sponsor server 240 to provide, to identity server 230, information identifying the one or more preferences relating to the data usage sponsorship campaign and provided via the user interface. Identity server 230 may receive the one or more preferences relating to the data usage sponsorship campaign.

As further shown in FIG. 4, process 400 may include generating configuration information for the campaign based on the preferences (block 440). For example, identity server 230 may generate configuration information based on the one or more preferences relating to the data usage sponsorship campaign. In some implementations, the configuration information may include information that indicates the name of the sponsor, the contact information for the sponsor, the address of the sponsor, the telephone number for the sponsor, the account information of the sponsor, etc.

In some implementations, the configuration information may include information that provides the identifiers of user devices 210 associated with the data usage sponsorship campaign. In some implementations, the configuration information may include information that indicates the date range for the data usage sponsorship campaign. In some implementations, the configuration information may include information that indicates content to associate with the data usage sponsorship campaign. In some implementations, the configuration information may include information that indicates a network path utilization threshold for the data usage sponsorship campaign. In some implementations, the configuration information may include information that indicates network path utilization tiers for the data usage sponsorship campaign. In some implementations, the configuration information may include information that indicates whether a user may define a content delivery deadline for the data usage sponsorship campaign. In some implementations, the configuration information may include information that indicates whether to display a sponsorship indication, based on a network path utilization cost, for the data usage sponsorship campaign. In some implementations, the configuration information may include information that indicates a maximum network path utilization cost for the data usage sponsorship campaign.

As further shown in FIG. 4, process 400 may include storing the configuration information and configuring the campaign based on the configuration information (block 450). For example, identity server 230 may store all or a portion of the configuration information generated by identity server 230 (e.g., in a data structure). In some implementations, identity server 230 may configure the data usage sponsorship campaign based on all or a portion of the stored configuration information.

In some implementations, sponsor server 240 may provide updates, to the one or more preferences relating to the data usage sponsorship campaign, to identity server 230 based on execution of the data usage sponsorship campaign. For example, sponsor server 240 may provide updates to the one or more preferences when content associated with the campaign needs to be changed (e.g., a new movie is added, an old movie is removed, etc.). In another example, sponsor server 240 may provide updates to the one or more preferences when other conditions associated with the campaign change (e.g., an employer may want to expand the content covered by the campaign, a restaurant may want to restrict data usage to a particular threshold, etc.). Identity server 230 may generate updates to the configuration information based on the updated preferences, and may store the updates to the configuration information. In some implementations, sponsor server 240 may provide the updates periodically based on a preference of the sponsor and/or based on a time frequency determined by sponsor server 240. In some implementations, sponsor server 240 may determine whether to provide the updates based on the type of the account associated with the sponsor.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
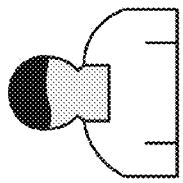
FIG. 5A is a diagram of an example user interface that may be used in connection with the example process shown in FIG. 4.

FIG. 5A is a diagram 500 of an example user interface 510 that may be used in connection with example process 400 shown in FIG. 4. In some implementations, user interface 510 may be provided by identity server 230 to sponsor server 240 to enable a sponsor to identify information (e.g., preferences) that may be used to configure a data usage sponsorship campaign.

As shown in FIG. 5A, user interface 510 may allow the sponsor to configure different features of the data usage sponsorship campaign. For example, the sponsor may identify one or more preferences for initiation of the data usage sponsorship campaign. In some implementations, the sponsor may indicate device identifiers of user devices 210 to associate with the data usage sponsorship campaign via user interface 510. For example, the sponsor may upload a spreadsheet of device identifiers to associate with the data usage sponsorship campaign. In some implementations, the sponsor may indicate a date range for the data usage sponsorship campaign via user interface 510. For example, as shown in FIG. 5A, the sponsor may indicate a start date of Dec. 30, 2013 and an end date of Jan. 15, 2014 for the date range of the data usage sponsorship campaign.

In some implementations, the sponsor may indicate content to associate with the data usage sponsorship campaign via user interface 510. For example, as shown in FIG. 5A, the sponsor may indicate that the sponsor is sponsoring particular content (e.g., a movie, a video, and a web site) for the data usage sponsorship campaign. In some implementations, the sponsor may indicate a network path utilization threshold for the data usage sponsorship campaign via user interface 510. For example, as shown in FIG. 5A, the sponsor may indicate that the data usage sponsorship campaign covers data usage when the network path utilization is less than 10%.

In some implementations, the sponsor may indicate network path utilization tiers for the data usage sponsorship campaign via user interface 510. For example, as shown in FIG. 5A, the sponsor may indicate that the sponsor will pay 100% of the data usage when the network path utilization is less than 10%, will pay 60% of the data usage when the network path utilization is not less than 10% and is less than 50%, and will pay 20% of the data usage when the network path utilization is not less than 50%. In some implementations, the sponsor may indicate whether a user may define a content delivery deadline for the data usage sponsorship campaign via user interface 510. For example, the user may indicate, via user device 210, that the user wishes to receive content (e.g., a movie) within the next five hours (or by a 3:00 PM delivery deadline). In such an example, the data usage sponsorship campaign may request that content server 220 provide the movie based on the network path utilization and by the delivery deadline. If the network path utilization is high (e.g., 75%) when the user requests the content and is historically lower (e.g., 30%) at 2:00 PM, the data usage sponsorship campaign may request that content server 220 provide the movie at 2:00 PM.

In some implementations, the sponsor may indicate, via user interface 510, whether the sponsorship indication, for the data usage sponsorship campaign, is to be displayed when a network utilization cost is less than a value. For example, as shown in FIG. 5A, the sponsor may indicate that the sponsorship indication is to be displayed when the network utilization cost is less than $0.50 per Gbit. In some implementations, the sponsor may indicate a maximum network path utilization cost for the data usage sponsorship campaign via user interface 510. For example, as shown in FIG. 5A, the sponsor may indicate that the data usage sponsorship campaign covers data usage when the maximum network path utilization cost is less than $1.00 per Gbit.

Once the sponsor has identified the preferences, user interface 510 may allow the sponsor to select a "Submit" option to store the preferences and/or submit the preferences to identity server 230. Identity server 230 may then generate configuration information based on the preferences.

As further shown in FIG. 5A, user interface 510 may also allow the sponsor to select a "Back" option to cause identity server 230 to provide information regarding the data usage sponsorship campaign. As also shown in FIG. 5A, user interface 510 may also allow the sponsor to select a "More Configuration" option to enable the sponsor to identify additional information that may be used to configure the data usage sponsorship campaign.

The number of elements of user interface 510 shown in FIG. 5A is provided for explanatory purposes. In practice, user interface 510 may include additional elements, fewer elements, different elements, or differently arranged elements than those shown in FIG. 5A.

FIG. 5B is a diagram 500 of an example data structure 520 that may be used in connection with example process 400 shown in FIG. 4. In some implementations, data structure 520 may be created, maintained, and/or stored by identity server 230, and may be used to implement a data usage sponsorship campaign. In some implementations, data structure 520 may be created, maintained, and/or stored by another device or a group of devices separate from or including identity server 230. In some implementations, data structure 520 may include a database, a table, a list, an array, etc.

As shown in FIG. 5B, data structure 520 may include a table with a campaign identifier (ID) field, a sponsor field, a sponsor account field, a date range field, a content field, a utilization threshold field, a utilization tiers field, a deadline field, a display threshold field, a maximum utilization cost field, and various entries associated with the fields. In some implementations, data structure 520 may include a different type of data structure, different fields, additional fields, and/or differently arranged fields.

The campaign ID field may include identifiers assigned to different data usage sponsorship campaigns by identity server 230. In some implementations, a sponsor may be associated with one or more campaign IDs that correspond to one or more data usage sponsorship campaigns created by the sponsor. For example, as shown in FIG. 5B, a movie provider may be associated with a first campaign ID (e.g., "123"), a company may be associated with a second campaign ID (e.g., "456"), etc.

The sponsor field may include information associated with a sponsor of a data usage sponsorship campaign identified in campaign ID field. In some implementations, the information associated with the sponsor may include a name of the sponsor, a physical address of the sponsor, contact information of the sponsor, billing information of the sponsor, etc. For example, as shown in FIG. 5B, the movie provider may be associated with the first campaign ID, the company may be associated with the second campaign ID, a sports team may be associated with the third campaign ID, etc.

The sponsor account field may include an account associated with the sponsor identified in the sponsor field. In some implementations, the account may include a billing account, of the sponsor, to which to charge the sponsor for data usage associated with a data usage sponsorship campaign identified in the campaign ID field. For example, as shown in FIG. 5B, the movie provider may include a billing account (e.g., "123456") associated with the first campaign ID, the company may include a billing account (e.g., "789101") associated with the second campaign ID, etc.

The date range field may include a date range associated with a data usage sponsorship campaign identified in the campaign ID field. In some implementations, the date range may define a date when a data usage sponsorship campaign, identified in the campaign ID field, is effective. For example, as shown in FIG. 5B, the data usage sponsorship campaign associated with the first campaign ID may be effective from Jan. 1, 2014 to Jan. 10, 2014, the data usage sponsorship campaign associated with the second campaign ID may not include a date range, the data usage sponsorship campaign associated with the third campaign ID may be effective from Feb. 2, 2014 to Mar. 2, 2014, etc.

The content field may include information associated with content that is to be sponsored by a data usage sponsorship campaign identified in the campaign ID field. In some implementations, the information associated with the content may include one or more web site addresses (e.g., uniform resource locators (URLs)), web page addresses, information indicating all data usage, etc. For example, as shown in FIG. 5B, the data usage sponsorship campaign associated with the first campaign ID may cover a movie, the data usage sponsorship campaign associated with the second campaign ID may cover a web site, etc.

The utilization threshold field may include information identifying a network path utilization threshold associated with a data usage sponsorship campaign identified in the campaign ID field. For example, as shown in FIG. 5B, the data usage sponsorship campaign associated with the first campaign ID may include a network path utilization threshold of less than 50%, the data usage sponsorship campaign associated with the second campaign ID may include a network path utilization threshold of less than 10%, etc.

The utilization tiers field may include information identifying network path utilization tiers associated with a data usage sponsorship campaign identified in the campaign ID field. For example, as shown in FIG. 5B, the data usage sponsorship campaign associated with the first campaign ID may not include network path utilization tiers, the data usage sponsorship campaign associated with the second campaign ID may include three network path utilization tiers, etc.

The deadline field may include information indicating whether a content delivery deadline may be associated with a data usage sponsorship campaign identified in the campaign ID field. For example, as shown in FIG. 5B, the data usage sponsorship campaigns associated with the first campaign ID and the second campaign ID may not be associated with a content delivery deadline, the data usage sponsorship campaign associated with the third campaign ID may be associated with a content delivery deadline, etc. As described above, a content delivery deadline may include a date or time, specified by a user of user device 210, when the user wishes to receive content from content server 220.

The display threshold field may include information indicating whether a sponsorship indication may be displayed when a network path utilization cost, associated with a data usage sponsorship campaign identified in the campaign ID field, is less than a threshold value. For example, as shown in FIG. 5B, the data usage sponsorship campaigns associated with the first campaign ID and the second campaign ID may not include a display threshold value, the data usage sponsorship campaign associated with the third campaign ID may include a display threshold value of less than $0.50 per Gbit, etc. For example, an indication message may be provided to user device 210 when data usage is sponsored for content, and user device 210 may display the message to the user. The indication message may indicate that data usage by user device 210 is completely sponsored, partially sponsored, sponsored up to a particular network path utilization cost, etc. for the content.

The maximum utilization cost field may include information identifying a maximum network path utilization cost (e.g., a maximum cost that the sponsor is willing to pay) associated with a data usage sponsorship campaign identified in the campaign ID field. For example, as shown in FIG. 5B, the data usage sponsorship campaigns associated with the first campaign ID and the second campaign ID may not include a maximum network path utilization cost, the data usage sponsorship campaign associated with the third campaign ID may include a maximum network path utilization cost of $1.00 per Gbit, etc.

FIG. 6 is a flow chart of an example process 600 for sponsoring usage of content provider web sites and/or applications based on network path utilization. In some implementations, one or more process blocks of FIG. 6 may be performed by identity server 230. In some implementations, one or more process blocks of FIG. 6 may be performed by another device or a group of devices separate from or including identity server 230.

As shown in FIG. 6, process 600 may include receiving an identifier associated with a user device and content information from a content server (block 610). For example, a user may utilize user device 210 to access content provided by content server 220. In some implementations, user device 210 may access a web site, a web page, an application, etc. that includes content provided by content server 220, and may display the content to the user. For example, the user may provide, to user device 210, an address (e.g., URL) associated with a web page provided by content server 220, and user device 210 may access the content via the web page and based on the address. In some implementations, the content may include embedded code that causes user device 210 to provide a device identifier (e.g., a MDN, a MEID, an IP address, etc.) of user device 210 to content server 220 (e.g., with the permission of the user) and/or to identity server 230. In some implementations, the device identifier may be encrypted so that content server 220 may not be able to determine the device identifier.

If user device 210 provides the device identifier to content server 220, content server 220 may forward the device identifier to identity server 230, along with information associated with the content. In some implementations, if the device identifier is encrypted, identity server 230 may decrypt the device identifier (e.g., based on sharing encryption keys with user device 210). In some implementations, user device 210 may provide the device identifier to identity server 230 based on user device 210 utilizing a service (e.g., a telecommunications service, an Internet service, etc.) associated with identity server 230. Identity server 230 may receive the device identifier of user device 210 from content server 220 and/or from user device 210.

In some implementations, content server 220 may provide content information to identity server 230. The content information may include, for example, information identifying the content provided to user device 210 by content server 220, a time period associated with when user device 210 accesses the content from content server 220, a length of time that user device 210 utilizes the content, etc.

As further shown in FIG. 6, process 600 may include receiving or determining utilization of a network path between the user device and the content server (block 620). For example, in order to access the content, user device 210 may connect with content server 220 via network 250. Network 250 may define a network path, via one or more devices of network 250, through which user device 210 may connect with content server 220. In some implementations, the network path may include a specific capacity or bandwidth. In some implementations, one or more other user devices 210 and one or more other content servers 220 may also utilize the network path, which may reduce the available capacity of the network path. In some implementations, content server 220 may determine a utilization of the network path provided between user device 210 and content server 220 based on information received from network 250 about the network path, information about data communicated between user device 210 and content server 220, etc. For example, content server 220 may determine the utilization of the network path as a percentage of the capacity of the network path (e.g., 20% of the capacity of the network path may be utilized and unavailable). Content server 220 may provide the utilization of the network path to identity server 230.

In some implementations, identity server 230 may determine the utilization of the network path provided between user device 210 and content server 220 based on information associated with data usage by user device 210, content server 220, other user devices 210, and/or other content servers 220.

As further shown in FIG. 6, process 600 may include receiving information associated with data usage by the user device (block 630). For example, as user device 210 accesses the content from content server 220, data usage may be accrued for user device 210. In some implementations, user device 210 may access other content from other sources, and data usage may be accrued as user device 210 accesses the other content. In some implementations, user device 210 may generate information associated with the data usage, such as, for example, information identifying an amount of data usage by user device 210, information identifying the content accessed by user device 210, information identifying a date(s) when the content is accessed by user device 210, information identifying a location(s) of user device 210 when the content is accessed by user device 210, information identifying a time period(s) when the content is accessed by user device 210, etc.

In some implementations, user device 210 may provide the information associated with the data usage to identity server 230, and identity server 230 may receive the information associated with the data usage. In some implementations, content server 220 may generate the information associated with the data usage of user device 210 (e.g., since content server 220 may host sponsored content). In such implementations, content server 220 may provide the information associated with the data usage to identity server 230, and identity server 230 may receive the information associated with the data usage. In some implementations, identity server 230 may store the information associated with the data usage of user device 210 in storage associated with identity server 230 (e.g., in memory 330, FIG. 3).

As further shown in FIG. 6, process 600 may include determining whether the data usage is sponsored based on the content information and the utilization of the network path (block 630). For example, identity server 230 may determine whether the data usage of user device 210 is sponsored, by a sponsor, based on the content information and the utilization of the network path provided between user device 210 and content server 220. In some implementations, identity server 230 may include or be associated with a data structure (e.g., data structure 520) that includes information associated with data usage sponsorship campaigns. For example, the data structure may include IDs associated with the data usage sponsorship campaigns; sponsor information associated with the data usage sponsorship campaigns; information associated with content included the data usage sponsorship campaigns; network path utilization thresholds associated with the data usage sponsorship campaigns, and/or other information associated with the data usage sponsorship campaigns (e.g., date ranges, etc.). Identity server 230 may compare the content accessed by user device 210 with the information associated with content provided in the data structure, and may compare the utilization of the network path with the network path utilization thresholds provided in the data structure, in order to determine whether some, none, or all of the data usage of user device 210 is sponsored.

In some implementations, if information regarding the content accessed by user device 210 matches particular content identified in the data structure, identity server 230 may determine a particular data usage sponsorship campaign associated with the particular content. Identity server 230 may then compare the utilization of the network path with the network path utilization thresholds, associated with the particular campaign and provided in data structure 520, in order to determine whether the data usage of user device 210 meets the requirements of the network path utilization thresholds.

As further shown in FIG. 6, if the data usage is not sponsored (block 640—NO), process 600 may include assigning charges for the data usage to an account associated with the user device (block 650). For example, if identity server 230 determines that the data usage of user device 210 is not sponsored, identity server 230 may assign charges for the data usage of user device 210 to an account associated with user device 210. In some implementations, identity server 230 may determine that the data usage of user device 210 is not sponsored when the content accessed by user device 210 does not match the information associated with content provided in data structure 520. In some implementations, identity server 230 may determine that the data usage of user device 210 is not sponsored when the content accessed by user device 210 matches content identified in data structure 520, but the utilization of the network path does not meet one or more of the requirements of the network path utilization thresholds provided in data structure 520. For example, assume that the content accessed by user device 210 is associated with a particular data usage sponsorship campaign, provided in data structure 520. However, assume that the utilization of the network path, provided between user device 210 and content server 220, exceeds the network path utilization threshold associated with the particular data usage sponsorship campaign. In such an example, identity server 230 may determine that the data usage of user device 210 is not sponsored because the data usage of user device 210 does not meet the network path utilization threshold requirement of the campaign.

In some implementations, if identity server 230 determines that the data usage of user device 210 is not sponsored, identity server 230 may assign charges for the data usage of user device 210 to an account associated with user device 210. For example, the user of user device 210 may have established an account with an entity associated with identity server 230 for a service (e.g., a telecommunications service, an Internet service, a television service, etc.) provided by the entity associated with identity server 230 to user device 210. In such an example, identity server 230 may assign the charges for the data usage of user device 210 to the user's account. In some implementations, identity server 230 may generate a bill for the user's account, and the entity associated with identity server 230 may provide the bill to the user.

As further shown in FIG. 6, if the data usage is sponsored (block 640—YES), process 600 may include determining a sponsor of the data usage (block 660). For example, if identity server 230 determines that the data usage of user device 210 is sponsored, identity server 230 may determine a sponsor of the data usage of user device 210. In some implementations, identity server 230 may determine that the data usage of user device 210 is sponsored when the content accessed by user device 210 matches the content information provided in data structure 520, and the utilization of the network path meets the requirements of the network path utilization thresholds, associated with the matching content, provided in data structure 520. For example, assume that the content accessed by user device 210 is associated with a particular data usage sponsorship campaign, provided in data structure 520. Further, assume that the utilization of the network path, provided between user device 210 and content server 220, is less than the network path utilization threshold associated with the particular data usage sponsorship campaign. In such an example, identity server 230 may determine that the data usage of user device 210 is sponsored because the data usage of user device 210 meets the content requirement and the network path utilization threshold requirement of the campaign.

In some implementations, if identity server 230 determines that the data usage of user device 210 is sponsored, identity server 230 may identify a sponsor associated with the data usage sponsorship campaign. For example, identity server 230 may identify, in data structure 520, a particular data usage sponsorship campaign associated with the content accessed by user device 210, and may further identify, in data structure 520, a particular sponsor based on the particular data usage sponsorship campaign.

As further shown in FIG. 6, process 600 may include assigning the charges for the data usage to an account associated with the sponsor (block 670). For example, if identity server 230 determines that the data usage of user device 210 is sponsored by a sponsor, identity server 230 may assign charges for the data usage of user device 210 to an account associated with the sponsor. In some implementations, if identity server 230 determines that the data usage of user device 210 is sponsored, identity server 230 may assign charges for the data usage of user device 210 to an account associated with sponsor server 240. For example, a sponsor of sponsor server 240 may have established an account with identity server 230 for sponsoring data usage by one or more user devices 210. In such an example, identity server 230 may assign the charges for the data usage of user device 210 to the sponsor's account. In some implementations, identity server 230 may generate a bill for the sponsor's account, and the entity associated with identity server 230 may provide the bill to the sponsor.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
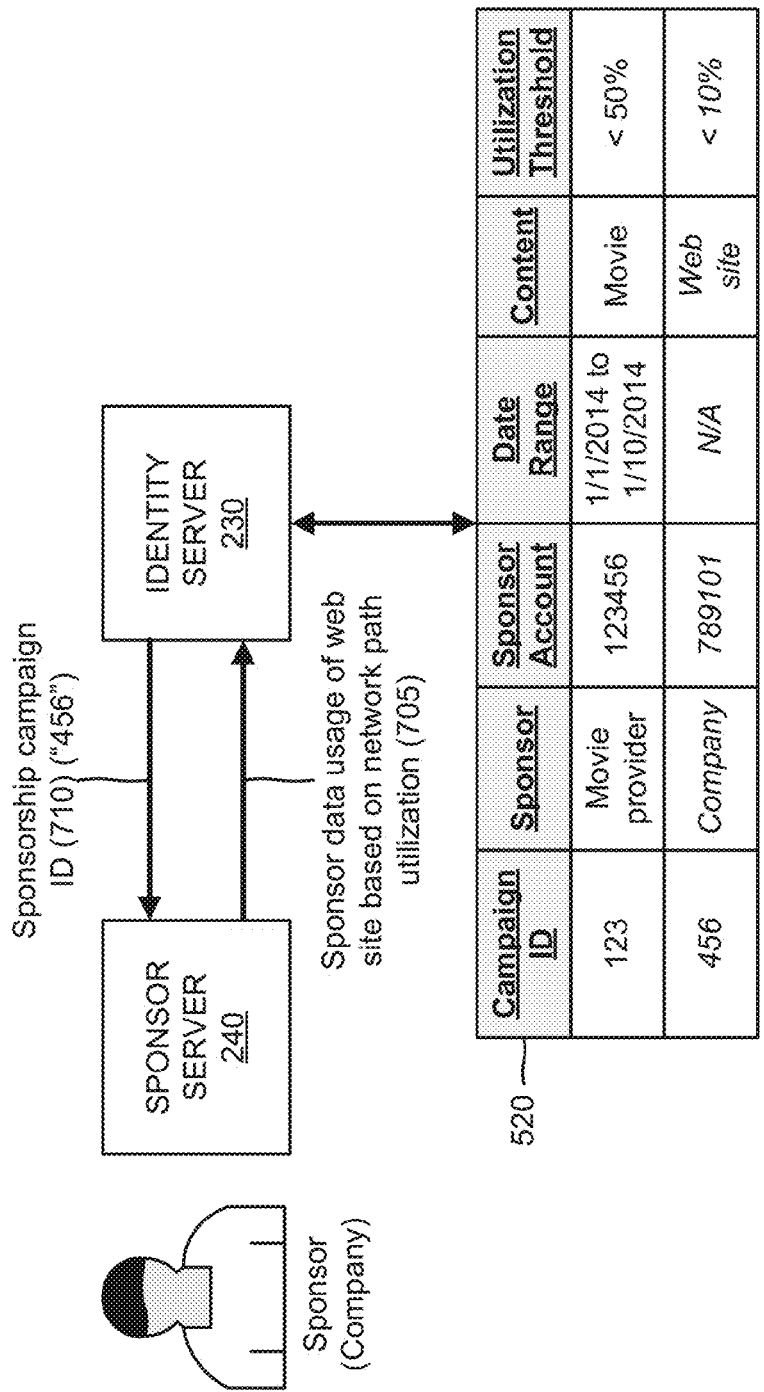

FIGS. 7A-7D are diagrams of an example 700 relating to example process 600 shown in FIG. 6. In example 700, assume that a sponsor (e.g., a company) is associated with sponsor server 220, as shown in FIG. 7A. Further, assume that the company utilizes sponsor server 240 to sponsor data usage of a web site based on network path utilization, as indicated by reference number 705. For example, the company may utilize sponsor server 240 to access a user interface (e.g., user interface 510, FIG. 5A), provided by identity server 230, that enables the company to create a data usage sponsorship campaign for the data usage of the web site. As shown in FIG. 7A, identity server 230 may store the data usage sponsorship campaign in data structure 520. The data usage sponsorship campaign may include a sponsor account (e.g., "789101"), particular content (e.g., the web site), and a network path utilization threshold (e.g., less than 10%). As further shown in FIG. 7A, identity server 230 may assign a sponsorship campaign ID 710 (e.g., "456") to the data usage sponsorship campaign, and may provide sponsorship campaign ID 710 to sponsor server 240.

Figure 7B:
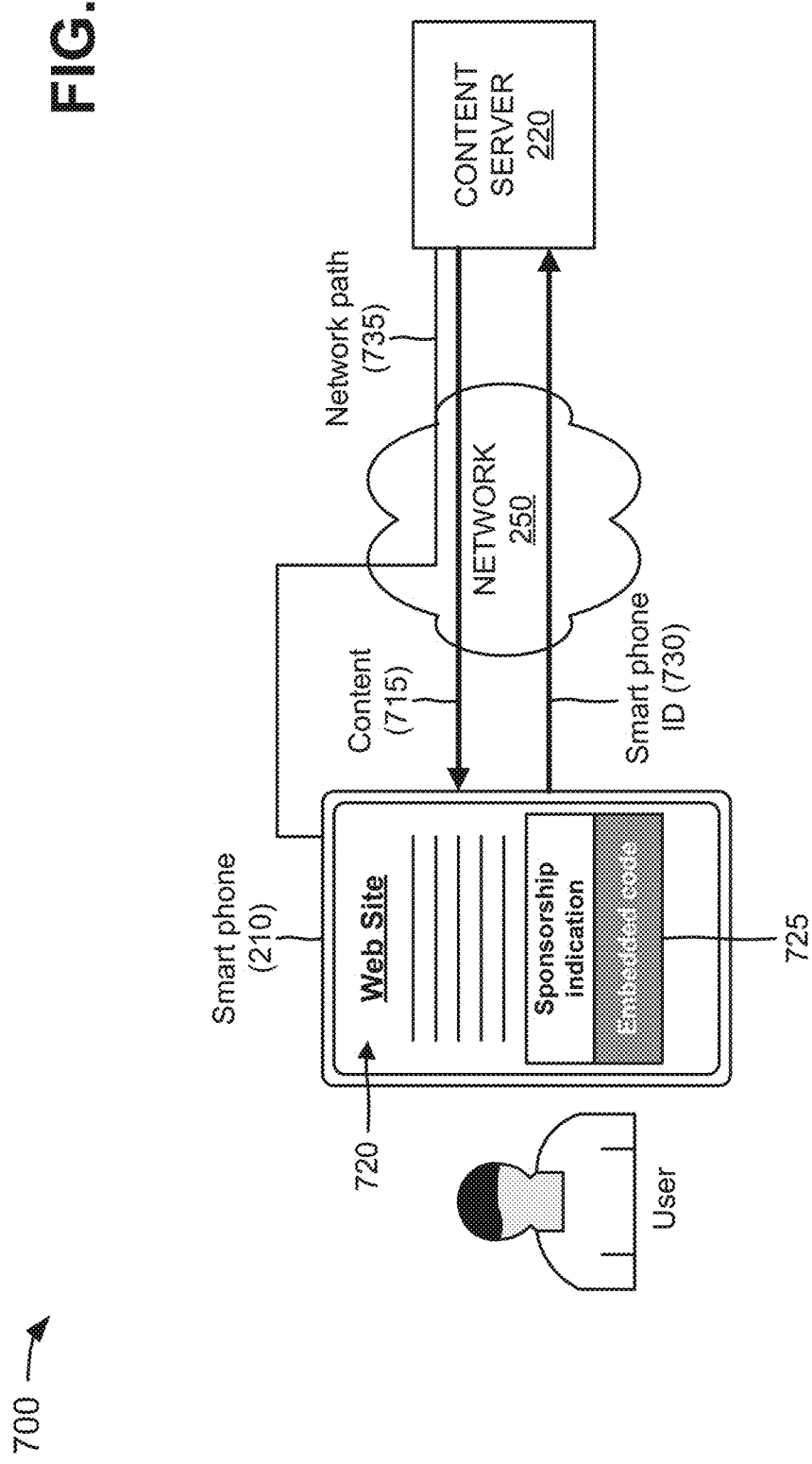

Now assume that a user is associated with a user device 210 (e.g., a smart phone 210), as shown in FIG. 7B. Further, assume that the user utilizes smart phone 210 to access content 715 provided by content server 220. For example, the user may access a web site 720 of content server 220, and smart phone 210 may display web site 720 to the user. As further shown in FIG. 7B, web site 720 may include embedded code 725 that causes smart phone 210 to provide an identifier (ID) 730 of smart phone 210 to content server 220 (e.g., with the user's permission and/or in an encrypted format). Embedded code 725 may also cause smart phone 210 to display information (e.g., a sponsorship indication) indicating that data usage associated with utilizing web site 720 is sponsored. As further shown in FIG. 7B, a network path 735 may be established between smart phone 210 and content server 220 by network 250.

As shown in FIG. 7C, content server 220 may forward identifier 730 of smart phone 210 to identity server 230, and identity server 230 may decrypt identifier 730 if identifier 730 is encrypted. Content server 220 may forward information 740 associated with utilization of network path 735 (e.g., 5% utilization) and content information 745 (e.g., identifying web site 720) to identity server 230. While smart phone 210 accesses web site 720, smart phone 210 may accrue data usage, and information 750 associated with the data usage of web site 720 may be provided to identity server 230, as further shown in FIG. 7C. In some implementations, information 750 may include an address of web site 720, date and time information associated with the access of web site 720, etc.

Identity server 230 may compare content information 745 (e.g., identifying web site 720) and utilization information 740 with information provided in data structure 520 in order to determine whether smart phone's 210 data usage for accessing web site 720 is sponsored. As further shown in FIG. 7C, identity server 230 may determine that smart phone's 210 data usage for accessing web site 720 is sponsored since web site 720 and utilization information 740 satisfies information provided in data structure 520, as indicated by reference number 755. For example, web site 720 may match content associated with campaign ID 456, and the network path utilization threshold requirement associated with campaign ID 456 may be satisfied.

Figure 7D:
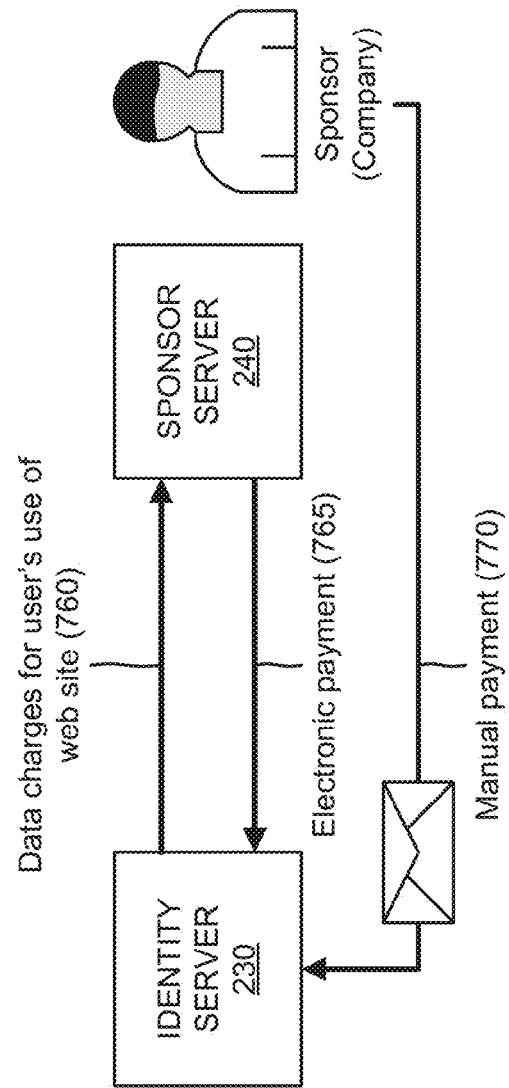

Based on this determination, identity server 230 may identify the company as the sponsor associated with campaign ID 456, and may generate data charges 760 for the user's access of web site 720, as shown in FIG. 7D. As further shown in FIG. 7D, identity server 230 may provide data charges 760 for the user's access of web site 720 to sponsor server 240 (e.g., to the company). In some implementations, the company may instruct sponsor server 240 to generate an electronic payment 765 for data charges 760, and to provide electronic payment 765 to an entity associated with identity server 230. In some implementations, the company may generate a manual payment 770 (e.g., a check) for data charges 760, and may provide manual payment 770 (e.g., via mail) to an entity associated with identity server 230.

If the user accesses other content not sponsored by the company, identity server 230 may generate other data charges for the user's access of the other content, and may provide the other data charges to the user. In some implementations, the user may instruct smart phone 210 to generate an electronic payment for the other data charges, and to provide the electronic payment to identity server 230. In some implementations, the user may generate a manual payment (e.g., a check) for the other data charges, and may provide the manual payment (e.g., via mail) to an entity associated with identity server 230.

As indicated above, FIGS. 7A-7D are provided merely as an example. Other examples are possible and may differ from what was described with regard to FIGS. 7A-7D. In some implementations, the various operations described in connection with FIGS. 7A-7D may be performed automatically or at the request of the user.

Figure 8B:
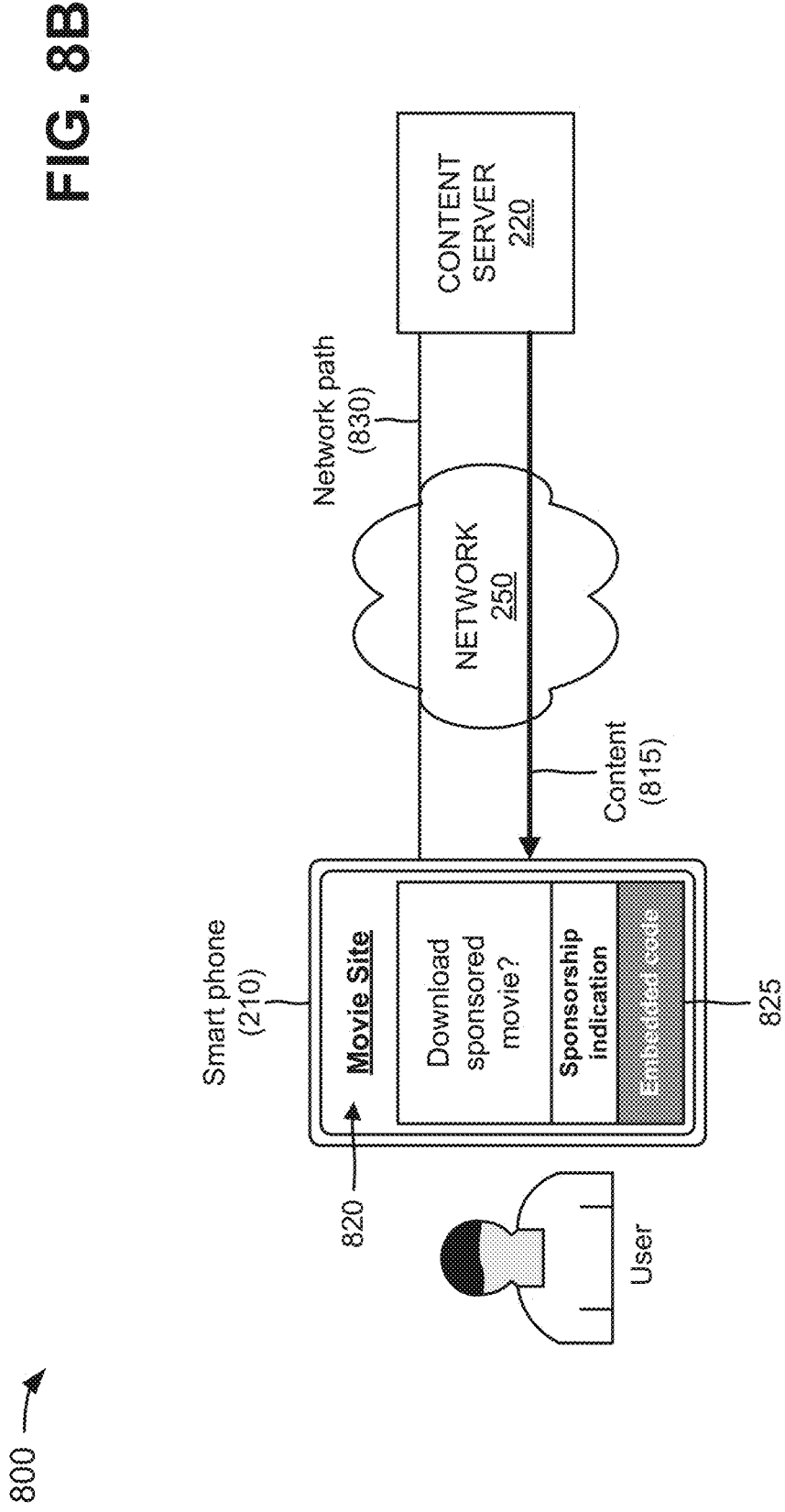

FIGS. 8A-8E are diagrams of another example 800 relating to example process 600 shown in FIG. 6. In example 800, assume that a sponsor (e.g., a movie provider) is associated with sponsor server 220, as shown in FIG. 8A. Further, assume that the movie provider utilizes sponsor server 240 to sponsor data usage of a movie based on network path utilization, as indicated by reference number 805. For example, the movie provider may utilize sponsor server 240 to access a user interface (e.g., user interface 510, FIG. 5A), provided by identity server 230, that enables the movie provider to create a data usage sponsorship campaign for the data usage of the movie. As shown in FIG. 8A, identity server 230 may store the data usage sponsorship campaign in data structure 520. The data usage sponsorship campaign may include a sponsor account (e.g., "123456"), a date range (e.g., Jan. 1, 2014 to Jan. 10, 2014), particular content (e.g., the movie), and a network path utilization threshold (e.g., less than 50%). As further shown in FIG. 8A, identity server 230 may assign a sponsorship campaign ID 810 (e.g., "123") to the data usage sponsorship campaign, and may provide sponsorship campaign ID 810 to sponsor server 240.

Now assume that a user is associated with a user device 210 (e.g., a smart phone 210), as shown in FIG. 8B. Further, assume that on Jan. 5, 2014 the user utilizes smart phone 210 to access content 815 provided by content server 220. For example, the user may access a movie site 820 of content server 220, and smart phone 210 may display movie site 820 to the user. As further shown in FIG. 8B, movie site 820 may include embedded code 825 that causes smart phone 210 to display information (e.g., a sponsorship indication) indicating that data usage associated with utilizing web site 820 is sponsored. For example, the sponsorship indication may indicate that data usage associated with downloading the movie is sponsored by the movie provider. As further shown in FIG. 8B, a network path 830 may be established between smart phone 210 and content server 220 by network 250.

Figure 8C:
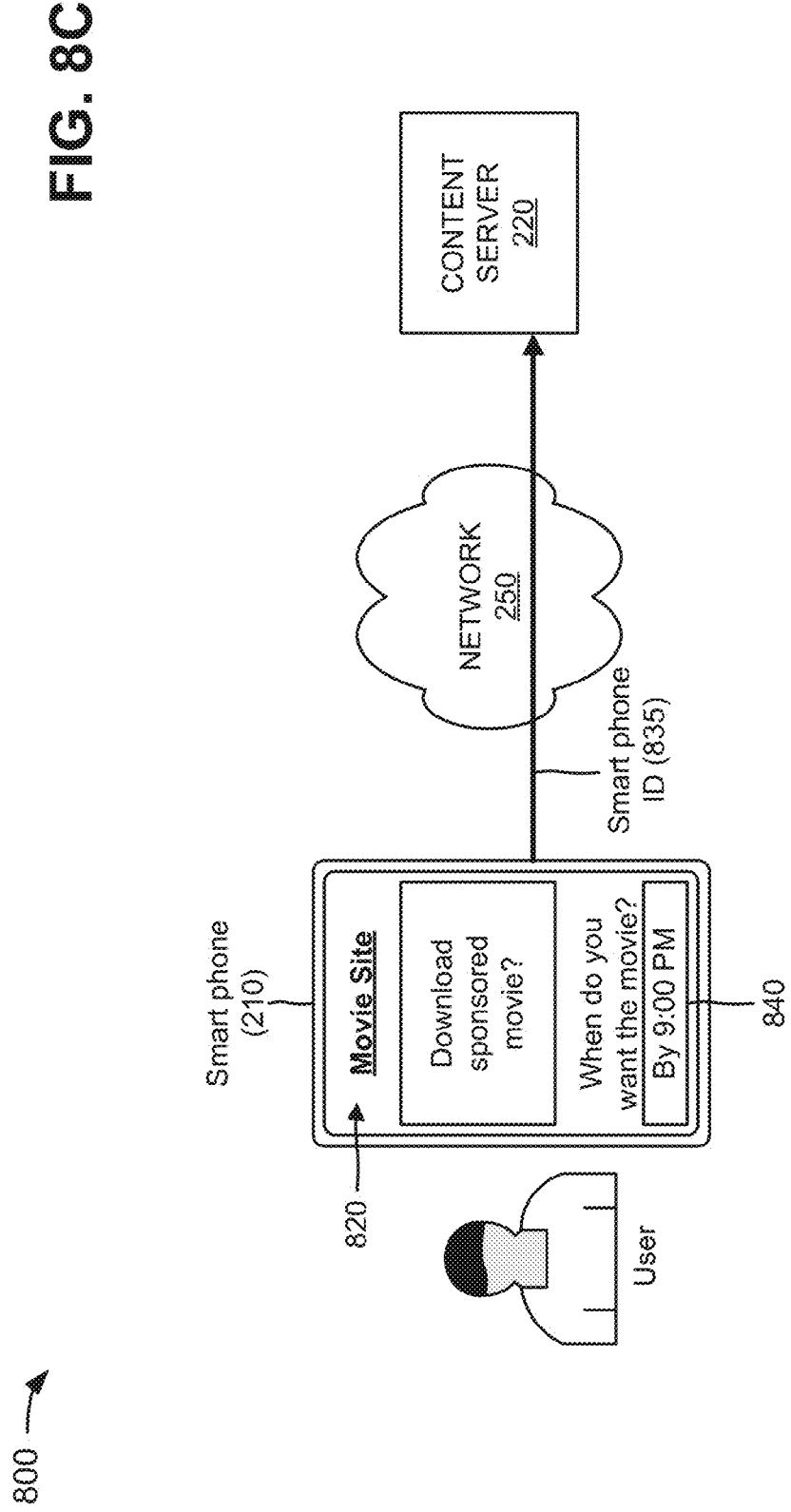

As shown in FIG. 8C, embedded code 825 may also cause smart phone 210 to provide an identifier (ID) 835 of smart phone 210 to content server 220 (e.g., with the user's permission and/or in an encrypted format). As further shown in FIG. 8C, the user may utilize smart phone 210 to specify when the user wants the movie to be completely downloaded (e.g., to view), as indicated by reference number 840. For example, the user may indicate that the user wants the movie to be completely downloaded by 9:00 PM on Jan. 5, 2014.

As shown in FIG. 8D, content server 220 may forward identifier 835 of smart phone 210 to identity server 230, and identity server 230 may decrypt identifier 835 if identifier 835 is encrypted. Content server 220 may begin downloading movie 840 to smart phone 210, as further shown in FIG. 8D. Content server 220 may forward information 845 associated with utilization of network path 830 (e.g., 25% utilization) and content information 850 (e.g., identifying movie 840) to identity server 230. While smart phone 210 downloads movie 840, smart phone 210 may accrue data usage, and information 855 associated with the data usage for downloading movie 840 may be provided to identity server 230, as further shown in FIG. 8D. In some implementations, information 855 may include information identifying movie 840, date and time information associated with downloading movie 840, etc.

Identity server 230 may compare content information 850 (e.g., identifying movie 840) and utilization information 845 with information provided in data structure 520 in order to determine whether smart phone's 210 data usage for downloading movie 840 is sponsored. As further shown in FIG. 8D, identity server 230 may determine that smart phone's 210 data usage for downloading movie 840 is sponsored since movie 840 and utilization information 845 match information provided in data structure 520, as indicated by reference number 860. For example, movie 840 may match content associated with campaign ID 123, and the network path utilization threshold requirement associated with campaign ID 123 may be satisfied.

Figure 8E:
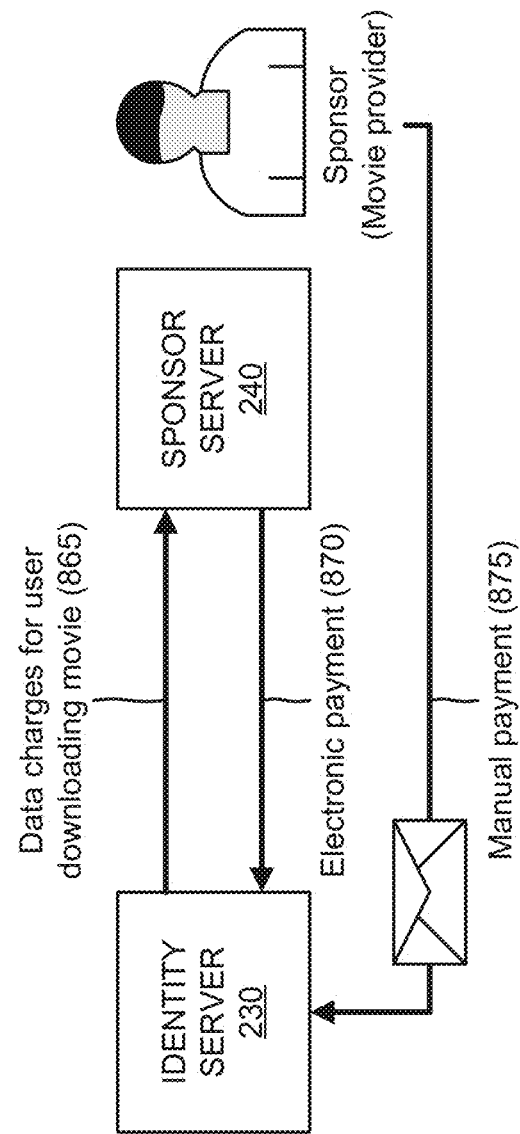

Based on this determination, identity server 230 may identify the movie provider as the sponsor associated with campaign ID 123, and may generate data charges 865 for the user downloading movie 840, as shown in FIG. 8E. As further shown in FIG. 8E, identity server 230 may provide data charges 865 for the user downloading movie 840 to sponsor server 240 (e.g., to the movie provider). In some implementations, the movie provider may instruct sponsor server 240 to generate an electronic payment 870 for data charges 865, and to provide electronic payment 870 to an entity associated with identity server 230. In some implementations, the movie provider may generate a manual payment 875 (e.g., a check) for data charges 865, and may provide manual payment 875 (e.g., via mail) to an entity associated with identity server 230.

As indicated above, FIGS. 8A-8E are provided merely as an example. Other examples are possible and may differ from what was described with regard to FIGS. 8A-8E. In some implementations, the various operations described in connection with FIGS. 8A-8E may be performed automatically or at the request of the user.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
receiving, by a device and from an entity associated with a sponsor for sponsoring data usage, information for a data usage sponsorship campaign, associated with an entity-identifiable group of users, based on providing a configuration interface,
the information including a plurality of entity-selected utilization tiers, entity-selected content, and entity-selected cost information;
receiving, by the device and from a content server device, content information associated with content accessed by a user device;
receiving, by the device, information associated with utilization of a network path provided between the user device and the content server device,
the utilization of the network path including at least one of:
a capacity of the network path, or
bandwidth of the network path;
receiving, by the device, information associated with data usage, by the user device, for accessing the content;
determining, by the device, whether the data usage is sponsored by the sponsor based on the content information and the information associated with the utilization of the network path,
the sponsor sponsoring data usage associated with particular content based on the utilization of the network path being below a threshold,
the sponsor sponsoring a first proportion of the data usage for a first utilization tier of the plurality of entity-selected utilization tiers,
the first utilization tier indicating that the utilization of the network path is less than a first percentage of the network path,
the sponsor sponsoring a second proportion of the data usage for a second utilization tier of the plurality of entity-selected utilization tiers,
the second utilization tier indicating that the utilization of the network path is greater than or equal to the first percentage of the network path, and
the first proportion of the data usage being greater than the second proportion of the data usage, and
the sponsor not sponsoring the data usage based on the utilization of the network path not being below the threshold; and
sending, by the device, charges for the data usage:
to an account associated with the user device based on the data usage not being sponsored by the sponsor, or
to an account associated with the sponsor based on the data usage being sponsored by the sponsor.

2. The method of claim 1, further comprising:
determining the sponsor based on the content information and the information associated with the utilization of the network path; and
identifying the account associated with the sponsor.

3. The method of claim 1, where the information associated with the utilization of the network path includes a percentage, of a capacity of the network path, that is unavailable.

4. The method of claim 1, where the sponsor sponsors the data usage of the user device based on one or more of:
a date associated with the data usage,
the content accessed by the user device during the data usage, or
a cost associated with the utilization of the network path.

5. The method of claim 1, where, prior to receiving the content information, the method further comprises:
receiving a request to create the data usage sponsorship campaign from a sponsor device associated with the sponsor;
generating, based on the received information for the data usage sponsorship campaign, configuration information for the data usage sponsorship campaign; and
configuring the data usage sponsorship campaign based on the configuration information.

6. The method of claim 5, further comprising:
storing the configuration information for the data usage sponsorship campaign.

7. The method of claim 5, further comprising:
providing, to the user device, information associated with the data usage sponsorship campaign based on a cost associated with the utilization of the network path being below a cost threshold.

8. A device comprising:
one or more processors to:
receive a request to create a data usage sponsorship campaign,
provide, based on receiving the request, a configuration interface,
receive, from an entity associated with a sponsor for sponsoring data usage and based on providing the configuration interface, information for the data usage sponsorship campaign associated with an entity-identifiable group of users,
the information including a plurality of entity-selected utilization tiers, entity-selected content, and entity-selected cost information,
generate, based on the received information, configuration information for the data usage sponsorship campaign, and
configure the data usage sponsorship campaign based on the configuration information,
the data usage sponsorship campaign sponsoring data usage, associated with particular content by a plurality of user devices based on utilizations of network paths, associated with the plurality of user devices, being below a threshold,
the utilizations of the network paths including at least one of:
specific capacities of the network paths, or
bandwidths of the network paths,
the data usage sponsorship campaign sponsoring a first proportion of the data usage for a first utilization tier of the plurality of entity-selected utilization tiers, the first utilization tier indicating that the utilizations of the network paths are less than a first percentage of the network paths, the data usage sponsorship campaign sponsoring a second proportion of the data usage for a second utilization tier of the plurality of entity-selected utilization tiers, the second utilization tier indicating that the utilizations of the network paths are greater than or equal to the first percentage of the network paths, and the first proportion of the data usage being greater than the second proportion of the data usage, and the data usage sponsorship campaign not sponsoring the data usage based on the utilizations of the network paths not being below the threshold.

9. The device of claim 8, where the one or more processors are further to: store the configuration information for the data usage sponsorship campaign.

10. The device of claim 8, where the one or more processors are further to:

receive content information associated with content accessed by a user device, of the plurality of user devices, from a content server device, receive information associated with utilization of a network path provided between the user device and the content server device, receive information associated with data usage, by the user device, for accessing the content, determine whether the data usage, by the user device, is included in the data usage sponsorship campaign based on the content information and the information associated with the utilization of the network path, provided between the user device and the content server device, and assign charges for the data usage by the user device:
to an account associated with the user device based on the data usage, by the user device, not being included in the data usage sponsorship campaign, or
to an account associated with the sponsor based on the data usage, by the user device, being included in the data usage sponsorship campaign.

11. The device of claim 10, where the one or more processors are further to:

determine the sponsor based on the content information and the information associated with the utilization of the network path provided between the user device and the content server device, and identify the account associated with the sponsor.

12. The device of claim 10, where the information, associated with the utilization of the network path provided between the user device and the content server device, includes a percentage, of a capacity of the network path, that is unavailable.

13. The device of claim 8, where the data usage sponsorship campaign sponsors data usage, by the plurality of user devices, based on one or more of:

dates associated with the data usage by the plurality of user devices, content accessed during the data usage by the plurality of user devices, or costs associated with the utilizations of the network paths.

14. The device of claim 8, where the one or more processors are further to:

provide, to the plurality of user devices, information associated with the data usage sponsorship campaign based on costs, associated with the utilizations of the network paths, being below a cost threshold.

15. A non-transitory computer-readable medium for storing instructions, the instructions comprising:

one or more instructions that, when executed by one or more processors of a device, cause the one or more processors to:

receive, from an entity associated with a sponsor for sponsoring data usage and based on providing a configuration interface, information for a data usage sponsorship campaign associated with an entity-identifiable group of users, the information including a plurality of entity-selected utilization tiers, entity-selected content, and entity-selected cost information;

receive content information associated with content accessed by a user device from a content server device, receive information associated with utilization of a network path provided between the user device and the content server device, the utilization of the network path including at least one of:
a capacity of the network path, or
bandwidth of the network path;

receive information associated with data usage by the user device for accessing the content, determine whether the data usage is sponsored by the data usage sponsorship campaign, associated with the sponsor, based on the content information and the information associated with the utilization of the network path, the data usage sponsorship campaign sponsoring data usage associated with particular content based on the utilization of the network path being below a threshold, the data usage sponsorship campaign sponsoring a first proportion of the data usage for a first utilization tier of the plurality of entity-selected utilization tiers, the first utilization tier indicating that the utilization of the network path is less than a first percentage of the network path, the data usage sponsorship campaign sponsoring a second proportion of the data usage for a second utilization tier of the plurality of entity-selected utilization tiers, the second utilization tier indicating that the utilization of the network path is greater than or equal to the first percentage of the network path, and the first proportion of the data usage being greater than the second proportion of the data usage, and the data usage sponsorship campaign not sponsoring the data usage based on the utilization of the network path not being below the threshold, and provide charges for the data usage:
to an account associated with the user device based on the data usage not being sponsored by the data usage sponsorship campaign, or
to an account associated with the sponsor based on the data usage being sponsored by the data usage sponsorship campaign.

16. The computer-readable medium of claim 15, where the one or more instructions, when executed by the one or more processors, further cause the one or more processors to:

determine the sponsor based on the content information and the information associated with the utilization of the network path, and identify the account associated with the sponsor.

17. The computer-readable medium of claim 15, where the information associated with the utilization of the network path includes a capacity of the network path that is available.

18. The computer-readable medium of claim 15, where the data usage sponsorship campaign sponsors the data usage of the user device based on one or more of:
   a date associated with the data usage,
   the content accessed by the user device during the data usage, or
   a cost associated with the utilization of the network path.

19. The computer-readable medium of claim 15, where the one or more instructions, when executed by the one or more processors, further cause the one or more processors to:
   receive a request to create the data usage sponsorship campaign, from a server device associated with the sponsor, prior to receiving the content information,
   generate, based on the received information for the data usage sponsorship campaign, configuration information for the data usage sponsorship campaign,
   configure the data usage sponsorship campaign based on the configuration information, and
   store the configuration information for the data usage sponsorship campaign.

20. The computer-readable medium of claim 19, where the one or more instructions, when executed by the one or more processors, further cause the one or more processors to:
   provide, to the user device, information associated with the data usage sponsorship campaign based on a cost, associated with the utilization of the network path, being below a cost threshold.

* * * * *